W. Morrison.
Harvester Cutter.
Nº 26198. Patented Nov. 22, 1859.

Witnesses.
J. B. Duncan
A. L. Spensler

Inventor.
Wm Morrison

UNITED STATES PATENT OFFICE.

WILLIAM MORRISON, OF CARLISLE, PENNSYLVANIA.

IMPROVEMENT IN HARVESTERS.

Specification forming part of Letters Patent No. 26,198, dated November 22, 1859.

*To all whom it may concern:*

Be it known that I, WILLIAM MORRISON, of Carlisle, in the county of Cumberland and State of Pennsylvania, have invented certain new and useful Improvements in Harvesters; and I do hereby declare that the following is a full and exact description thereof, reference being had to the accompanying drawings, and to the letters of reference marked thereon.

Figure 1:
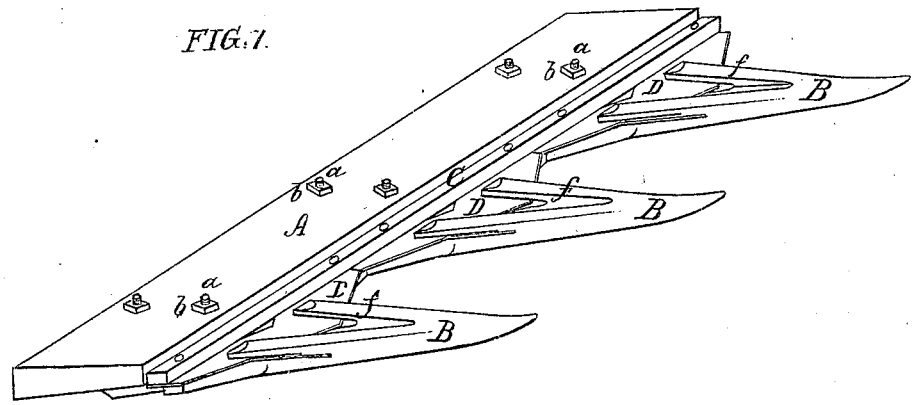
Figure 2:
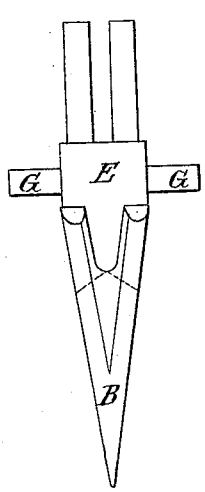
Figure 3:
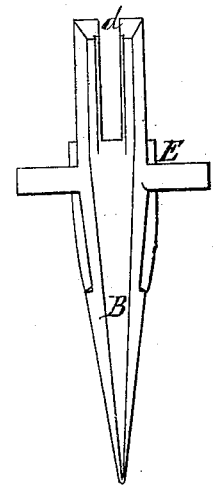
Figure 4:
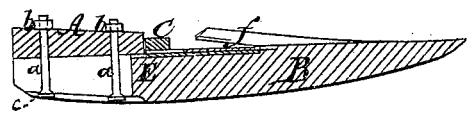

Figure 1 is a perspective view of my improved cutting apparatus. Fig. 2 is a top view of one of the fingers detached. Fig. 3 is a bottom view of the same; and Fig. 4 is a longitudinal section through one of the fingers, showing the manner of attaching the same to the finger-bar.

To enable others skilled in the art to make and use my invention, I will proceed to describe it.

The same letters of reference, wherever they occur in the several figures, refer to the same parts.

In the said drawings, A represents the finger-bar of a cutting apparatus; B, the fingers; C, the cutter-bar, and D the cutters connected therewith. E are the stationary cutters, which are secured to the fingers in the manner hereinafter described. G are the fenders. $a\ a$ are the bolts, and $b\ b$ the nuts for securing the fingers to the finger-bar. $f\ f$ are the caps or guards to the fingers, which are open at their rear end, and are forked in the manner shown in the drawings.

The fingers B are slotted or forked, and are open at their rear ends in the manner shown in the drawings, and are formed with the rabbets or ledges $d$, against which the heads $c$ of the bolts $a$ bear for the purpose of securing the fingers to the finger-bar. It will be seen that by this construction of the fingers, by merely loosening the nuts $b$ on the bolts $a$, and without removing them from the bolts, the fingers may be readily withdrawn or removed and replaced by new ones, in the event of being injured or broken, without the necessity of removing the bolts or the nuts thereon from the finger-bar.

The stationary cutters E are forked at the forward end and fit in a corresponding angularly-formed slot in the forward part of the finger, as shown by the dotted lines in Fig. 2. This formation serves to secure the forward end of the stationary cutter in the proper position for the performance of its work. Said stationary cutter is further secured from lateral play by fitting between the raised part of the fenders G, which are so formed that when the cutters are in place on the fingers the surface of the fenders shall flush with the surface of the stationary cutter. This stationary cutter thus steadied in its place upon the finger is bound down thereto by having the heel thereof slipped under the finger-bar as the finger is slipped into place on the bolts, and the tightening of the bolts firmly secures the said cutters to the face of the fingers. It will be seen that by this construction, by merely loosening the nuts on bolts $a$, the finger may be slipped forward slightly and the cutters E readily removed and sharpened and replaced, and again secured, as before, with very little labor and without the necessity of removing the fingers or the bolts which secure the same to the fingers, thereby effecting a great saving of time, and without any danger of the bolts and nuts becoming lost. The construction of the reciprocating cutter-bar and cutters, being the same as those in common use, does not need further description here.

Having thus fully described my invention, what I claim as new, and desire to secure by Letters Patent, is—

Providing the rear end of the finger with the open slot $d$, whereby I am enabled to readily remove the stationary cutters and fingers and to replace them without detaching the bolts or nuts which secure the fingers to the finger-bar, in the manner and for the purpose specified.

WM. MORRISON.

Attest:
J. B. DUNCAN,
A. S. SPONSLER.